United States Patent Office 3,000,672
Patented Sept. 19, 1961

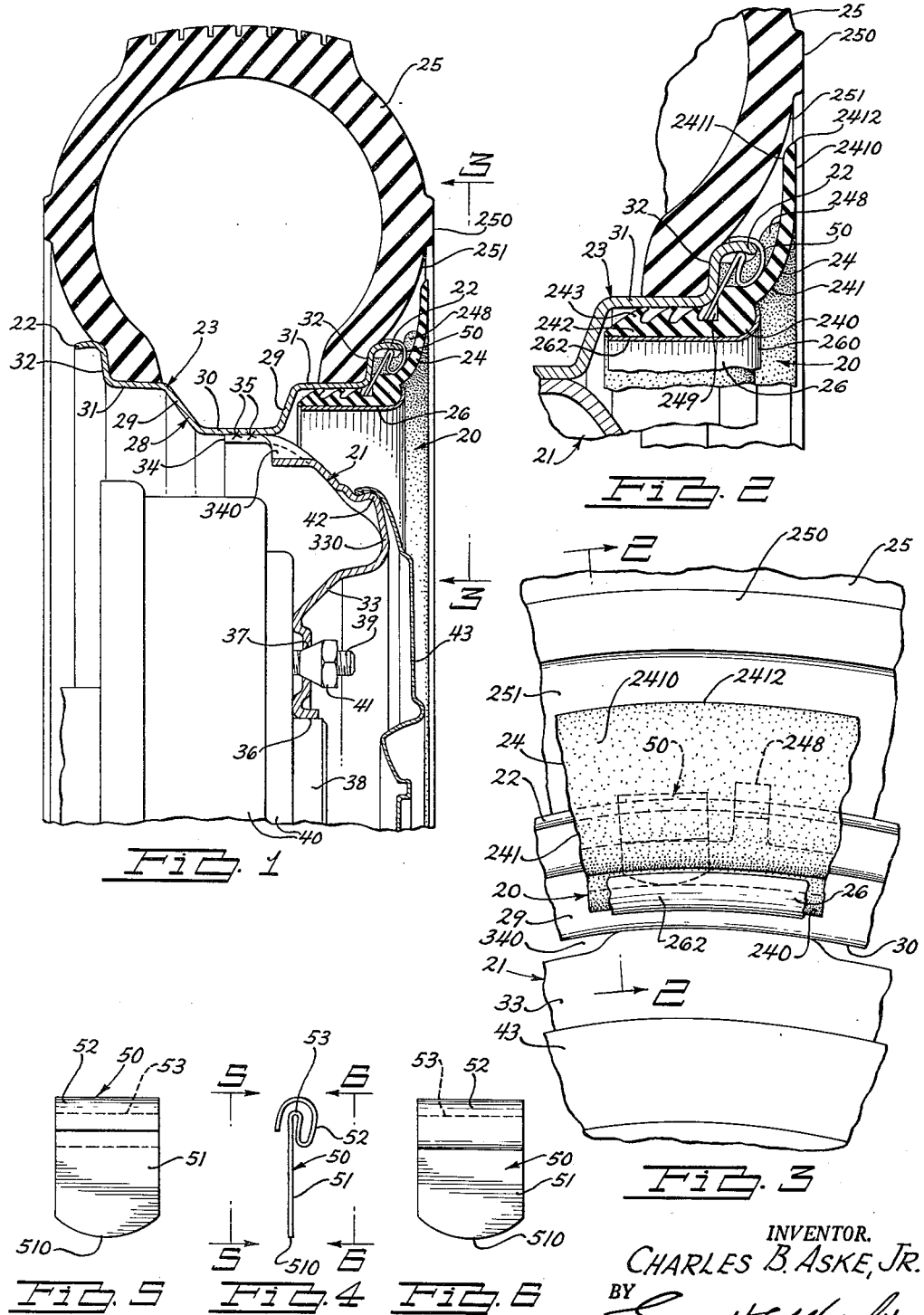

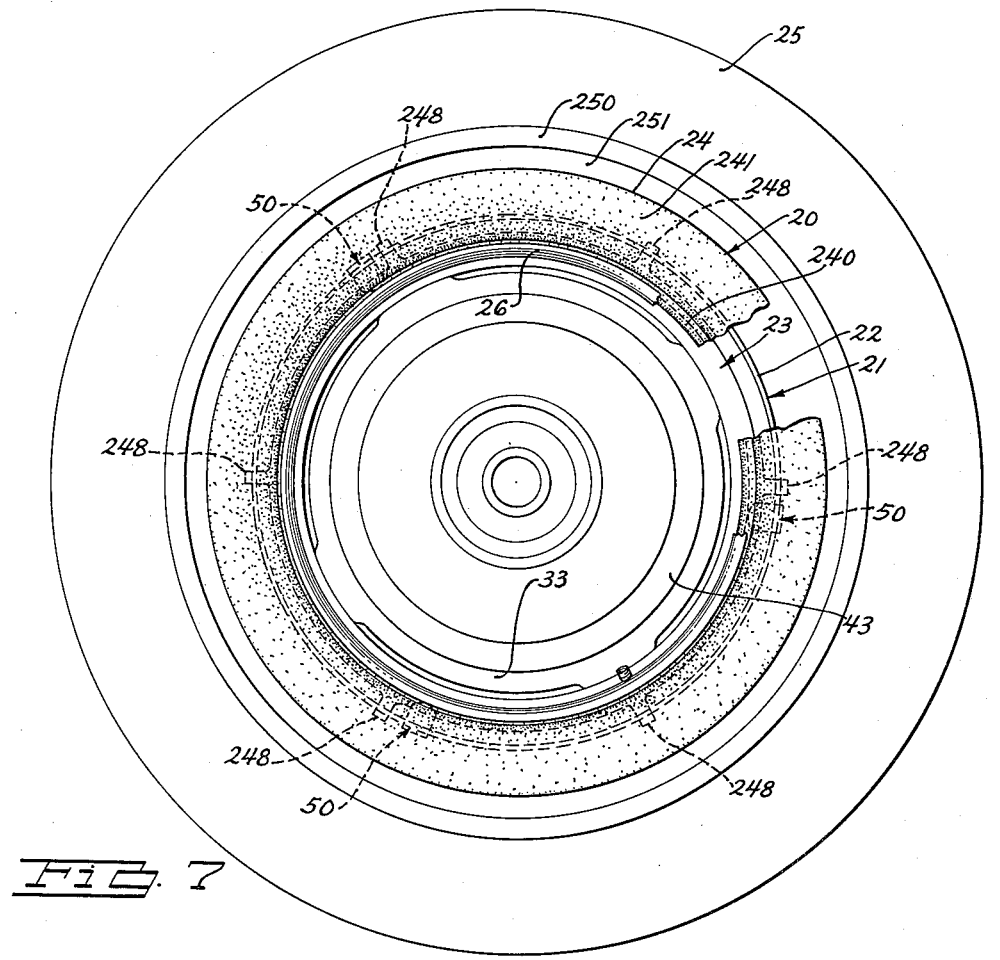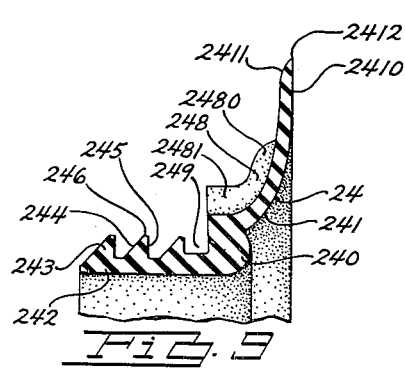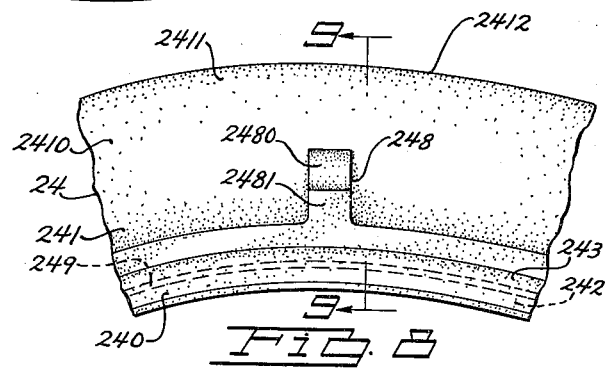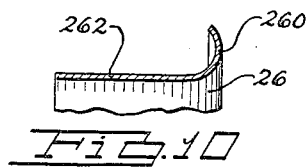

3,000,672
TIRE TRIM-WHEEL TRIM AUXILIARY
ANCHORAGE MEANS
Charles B. Aske, Jr., Birmingham, Mich., assignor, by mesne assignments, to Gar Wood Industries, Inc., a corporation of Michigan
Filed Feb. 3, 1961, Ser. No. 86,930
4 Claims. (Cl. 301—37)

This invention relates to tire trim-wheel trim construction for automotive vehicles wheels, and in particular to simple, effective auxiliary means for removably securing a tire trim-wheel trim assembly in place on a vehicle wheel.

Ordinarily, the outer tire bead seat annulus of a vehicle wheel is sufficiently wide and is so formed as to removably telescopingly receive in firm yet removable anchored relationship a tire-trim-wheel trim assembly consisting of a tire trim element having a radially disposed tire trim portion and an axially disposed anchorage portion which has telescoped therewithin a wheel trim element. The said wheel trim element sizes the anchorage portion of the tire trim element causing it to fit firmly in place within the tire bead seat of a vehicle wheel when the tire trim-wheel trim assembly is mounted on a vehicle wheel. The outer periphery of the anchorage portion of the tire trim element is preferably provided with a plurality of annular teeth which grip the tire bead seat annulus of the vehicle wheel when the said anchorage portion of the tire trim element and the wheel trim element are telescoped as a unit therewithin.

In some vehicle wheels, particularly the smaller size wheels for compact cars and others, the tire bead seat annulus is so narrow, or sometimes slopes slightly axially and radially outwardly, or both, that it is difficult to maintain a tire trim-wheel trim assembly of the class hereinbefore described firmly in its proper mounted position on a vehicle wheel.

Accordingly, it is the primary object of the instant invention to provide simple, easy to install, effective and inexpensive auxiliary anchorage means usable in combination with tire trim-wheel trim assemblies of the class described for positively holding such tire trim-wheel trim assemblies in their proper mounted position on vehicle wheels.

Other objects of the invention will become apparent by reference to the following detailed description taken in connection with the accompanying drawings in which:

FIG. 1 is a vertical sectional view through the upper half of a vehicle wheel and tire equipped with tire trim-wheel trim assembly and auxiliary anchorage means therefor embodying the invention.

FIG. 2 is an enlarged fragmentary detailed sectional view of the tire trim-wheel trim assembly and auxiliary anchorage means disclosed in FIG. 1.

FIG. 3 is an enlarged fragmentary elevational view taken on the line 3—3 of FIG. 1;

FIG. 4 is a side elevational view of an auxiliary anchorage clip means of the invention usable as illustrated in FIGS. 1, 2, 3 and 7.

FIG. 5 is a rear elevational view taken on the line 5—5 of FIG. 4.

FIG. 6 is a front elevational view taken on the line 6—6 of FIG. 4.

FIG. 7 is a side elevational view of a tire trim-wheel trim assembly mounted on a vehicle wheel showing the use of three auxiliary anchorage clips in combination therewith.

FIG. 8 is a fragmentary rear elevational view of the tire trim element shown in FIG. 9.

FIG. 9 is a cross sectional view of the tire trim element as molded, taken on the line 9—9 of FIG. 8.

FIG. 10 is a cross sectional view of a wheel trim element that may be employed with the tire trim element shown in FIG. 9.

Referring now to the drawings wherein like reference numerals refer to like and corresponding parts throughout the several views, the embodiment of the invention disclosed for illustrative purposes consists of an automotive vehicle tire trim-wheel trim assembly 20 and auxiliary anchorage means 50 which is readily mounted on a vehicle wheel 21 having a tubeless tire 25 thereon.

The said vehicle wheel 21 has a drop center rim 23 composed of a central channel or drop center 28 having side walls 29 and a base 30. An annular tire bead seat 31 extends laterally outwardly from each side of the side walls 29 of the drop center 28, each said tire bead seat 31 terminating in a tire bead seat flange 32 extending radially therefrom which is axially outwardly curved at its upper portion to form an axially disposed outer lip 22. The said tire bead seat flange 32 is ofttimes referred to as the wheel flange and the said lip 22 if ofttimes referred to as the lip of the wheel rim. Within the drop center rim 23 is a wheel spider 33 having an axially disposed flange 34 which is secured to the central channel 28 of the drop center rim 23 by such means as welding at 35. The said wheel spider 33 is provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide brake drum ventilation and added structural strength to the vehicle wheel 21. The spider 33 is generally formed with an annular axially outwardly extending collar 330 which is preferably provided with a plurality of hub cap retainer nubs 42 over which a conventional hub cap 43 is sprung for securement onto the vehicle wheel 21. The said spider collar 330 has an annular exposed painted surface extending from the outer periphery of the hub cap 43 to the drop center wheel rim 23, which also has its exposed surfaces painted. The particular tire 25 illustrated in the drawings is a modern tubeless tire having a scuff bead 250 extending from its side wall 251. The said tubeless tire 25, when used on the vehicle wheel 21, requires a valve stem (not shown) mounted in sealed relationship through a suitable valve stem aperture (not shown) provided in the outer wall 29 of the drop center rim channel 28 of the rim 23 of the said wheel 21.

The particlular tire trim-wheel trim assembly 20 shown for illustrative purposes consists of two elements; namely, a tire trim element 24 preferably molded of relatively firm yet resilient live rubber or other suitable material such as Butyl rubber, and a rim trim element 26 preferably formed of stainless steel or other relatively rigid material, which elements cooperate, not only to enhance and beautify the appearance of the vehicle wheel 21 and its tire 25 but also to removably secure the said wheel trim assembly 20 onto the vehicle wheel 21. The tire trim element 24 and the rim trim element 26 are assembled into a wheel trim-tire trim assembly 20 prior to mounting on the vehicle wheel 21. In combination with the tire trim-wheel trim assembly 20 are employed auxiliary anchorage means 50 which provide positive anchorage of the tire trim-wheel trim assembly 20 to the vehicle wheel 21 as hereinafter described so that, in the event a particular wheel 21 is slightly off-size, or the tire bead seat 31 thereof slopes radially and axially outwardly, or the tire bead seat is unusually narrow, the vehicle tire trim-wheel trim 20 may be used with assurance that it will not come off of the wheel 21 responsive to road shocks during driving a vehicle having its wheel and tires trimmed with tire trim-wheel trim embodying the invention.

The tire trim element 24 of the wheel trim 20 shown separately in FIGS. 8 and 9 may consist of an annular bead portion 240, an annular white or other colored side wall portion 241 extending radially outwardly from the said bead portion 240, and an annular anchorage flange portion 242 extending axially inwardly from said bead portion 240, the said annular anchorage flange portion 242 including a plurality of circumferential axially spaced teeth 243 disposed radially outwardly therefrom. The said side wall portion 241, in the instant illustrative embodiment of the invention, is formed so that its outer annulus 2410 is substantially radially disposed and free-standing in respect to the tire 25, and its outer periphery 2411 is spaced from the usually black side will 251 of the tire 25. With such construction, the side wall portion 241 of the tire trim element 24 is only contacted very lightly by the lateral tire bulge when the tire 25 flexes upon road contact while a motor vehicle having its wheels equipped with tire trim-wheel trim 20 of the invention is either standing still or being driven. Obviously, other conformations of the annular side wall portion 241 of the tire trim element can be employed, it being the intention that the auxiliary anchorage means of the invention may be used with other tire trim elements employing an anchorage flange portion 240 which is backed-up and sized by a rim trim element 26.

It should be noted that the white or other colored side wall portion 241 of the particular tire trim element 24 employed to illustrate the instant invention is not molded in a form to flex against the side wall 251 of the tire 25, but is preferably molded as shown in FIG. 9 to assume a free-standing attitude with respect to the tire wall 251 as best shown in FIGS. 1 and 2. To be assured that such free-standing attitude of the side wall portion 241 of the tire trim element 24 is maintained, a plurality of circumferentially spaced gage blocks 248 are molded on the rear thereof, the radial outer portion 2480 of the said gage blocks 248 being formed to contact and rest against the lip 22 of the wheel rim 23. The radial inner portion 2481 of each gage block 248 is formed to serve as a stop seat to properly locate the wheel trim assembly 20 when mounted on a vehicle wheel as hereinafter described. Any number of gage blocks 248 may be used, six being shown in FIG. 7. Of course, the gage blocks 248 may be formed to gage only on the tire bead seat flange 32 serving both as a stop to locate the tire trim-rim trim assembly 20 properly on the wheel rim 23 and to hold the outer annulus 2410 and the outer periphery 2411 of the side wall portion 241 of the tire trim element 24 in the desired relationship to the side wall 251 of the tire 25.

With the tire trim element 24 just described, the general objection to the use of Butyl rubber for tire trim-wheel trim assemblies is overcome. In the prior art, when the side wall portion 241 of a tire trim element 24 was molded to flex at its outer peripheral portion against the side wall 251 of a tire 25, two things happened. First, the side wall portion of the prior art tire trim element gouged into the tire wall, and secondly, the movement between the outer peripheral portion of the side wall portion of a Butyl rubber tire trim element and the tire wall caused a squeaking noise which was disturbing. The instant construction eliminates such conditions. Also, in prior constructions, when the tire trim element was made of live rubber, although the squeaking was eliminated, the outer peripheral portion of the side wall of a white or light colored tire trim element discolored due to bleed through of carbon black from the black tire wall occasioned by combined friction and pressure between the outer peripheral portion of the side wall of the tire trim element and the side wall of the vehicle tire. This condition also is substantially eliminated by the illustrated construction.

The rim trim element 26 of the wheel trim 20 shown separately in FIG. 10 preferably consists of an outer annular bead or bull-nose portion 260 and an annular sleeve portion 262 extending axially inwardly from the said bull-nose portion 260. The said annular sleeve portion 262 may be suitably ornamented if desired by stamping or roll forming the blanks from which it is made. The said bull-nose portion 260 of the rim trim element 26 is formed to conform with the bead portion 240 of the tire trim element 24 when juxtaposed therewith when the annular anchorage flange portion 242 of the tire trim element 24 is telescoped over and assembled with the annular sleeve portion 262 of the rim trim element 26 to form the tire trim-wheel trim assembly 20 shown mounted on the vehicle wheel 21 in FIGS. 1 and 2. The rim trim element 26 is preferably roll formed from strip stock cut off to length and secured into a ring of the proper diameter by any suitable means such as by a lap or interlock joint, and/or by welding.

Each of the circumferential radially outwardly disposed teeth 243 of the annular anchorage flange portion 242 of the tire trim element 24 is preferably formed substantially triangular in cross section with a generally radially disposed axially outwardly facing wall 245 and an axially inwardly sloping wall 244. When the wheel trim assembly 20 is mounted axially onto a vehicle wheel 21 as hereinafter described, the said radially disposed axially outwardly facing circumferential teeth 243 of the anchorage flange portion 242 of the tire trim element 24 flex axially outwardly and radially inwardly into firm engagement with the radially inner annulus of the tire bead seat 31 of the wheel rim 23. The apex 246 of each of the said circumferential teeth 243 is preferably slightly truncated as shown in FIG. 5 so as to permit the circumferential teeth 244 to roll over from their locked position shown in FIGS. 1 and 2 to a position disposed axially inwardly when the said wheel tire trim-wheel trim assembly is forcibly removed axially from the vehicle wheel 21.

The tire trim element 24 and the rim trim element 26 of the wheel trim 20 are of such diameter in respect to each other that the anchorage flange portion 242 of the tire trim element 24 may be telescoped or otherwise firmly anchored in assembled relationship onto the sleeve portion 262 of the rim trim element 26 before mounting on the vehicle wheel 21. This, in effect, properly sizes the tire trim element 24 and maintains it in the correct annular form and size. When the tire trim element 24 and the wheel trim 20 are so assembled, the diameter of the apices 246 of the radially disposed axially outwardly facing teeth 243 is somewhat greater than the inner diameter of the annular tire bead seat 31 of the rim 23 of the vehicle wheel 21 so that, when the anchorage flange 242 of the tire trim element 24 and the sleeve portion 262 of the rim trim element 26 of the wheel trim assembly 20 are forcibly telescoped within the inner annulus of the tire bead seat 31, until the radial inner portion 2481 of each gage block 248 abuts the tire bead seat flange 32 of the wheel rim 23, the tire trim-wheel trim assembly 20 is firmly anchored in its proper mounted position on the vehicle wheel 21. When the tire trim-wheel trim assembly 20 is so mounted on the vehicle wheel 21, the radially outer portion 2480 of each said gage block 248 abuts the lip 22 of the wheel rim 23 and maintains the side wall portion 241 of the tire trim element 24 in its proper position shown in FIGS. 1 and 2.

Vehicle wheel trim 20 illustrated herein is properly gaged by the gage blocks 248 extending axially inwardly of the side wall portion 241 of the tire trim element 24 to the wheel rim 23, both by the radial outer portion 2480 of the gage blocks 248 contacting the lip 22 of the wheel rim 23 and by the radial inner portion 2481 of the said gage blocks 248 contacting the tire bead seat flange 32, all of which not only assures perfect location of the vehicle wheel trim 20 on the vehicle wheel 21 but maintains the outer annular portion 2410 of the side wall 241 of the tire trim element of the said vehicle wheel trim 20 properly disposed and in free-standing relationship to the side wall 251 of the tire 25 where it is only contacted very lightly, if at all, by that portion of the vehicle tire that bulges laterally upon road contact. Thusly, the side wall 251 of the tire 25 is always completely air cooled and thereby excessive heat at the tire side wall 251 behind the side wall 241 of the tire trim element 24 is eliminated. It will be noted that the outer peripheral edge 2412 of the tire trim element 24 is so disposed as to never be contacted by the wall 251 of the tire 25 whereby to eliminate edge discoloration that otherwise might possibly occur when a very thin white or colored natural rubber element is frequently contacted by rubber containing a substantial amount of carbon black. The use of Butyl rubber rather than natural rubber for the tire trim element 24 would withstand discoloration even if a relatively thin outer peripheral edge 2412 thereof were exposed to frequent contact by the wall 251 of the tire 25.

Although a particular tire trim element 24 has been described herein, it is to be understood that a tire trim element employed in the instant invention preferably should have an annular groove or pockets 249 axially outwardly of the axially outermost of the teeth 243 of the anchorage flange portion 242 thereof so as to provide a suitable abutment 2490 against which the inner stake end 510 of the anchorage arm 51 of the auxiliary anchorage means 50 may abut as later described in detail. In some tire trim elements 24, the axial outwardly facing wall of the axial outer circumferential tooth 243 may serve as a wall of the annular groove 249 as shown particularly in FIG. 9; however, it is obvious that in other constructions, a suitably located specially formed abutment groove or pocket may be required, or, in the event the rubber or synthetic rubber out of which the tire trim element 24 is molded is sufficiently resilient, the inner stake end 510 of the anchorage arm 51 of the auxiliary anchorage means 50 may seat itself therein thereby forming its own abutment in the anchorage flange portion 242 of the said tire trim element 24 without the provision of a groove or pockets into which the auxiliary anchorage means 50 could seat.

Because of the fact that on some vehicle wheels, particularly relatively small wheels and wheels for the modern compact cars, the tire bead seat 31 thereof is relatively narrow and ofttimes slopes to some extent axially and radially outwardly, it becomes difficult to maintain tire trim-wheel trim assemblies such as the tire trim 20 herein described for illustrative purposes firmly and positively mounted on a vehicle wheel. Also, when selling tire trim of the class described in the "after-market," the tire bead seats of wheels of the same nominal size vary somewhat in diameter as well as in width and slope. To make possible the positive removable securement to a wheel 21 of tire trim-wheel trim construction 20 and other forms thereof of the type employing anchorage means including resilient annular axially spaced resilient teeth which grip the tire bead seat annulus 31 of the rim 23 of the said vehicle wheel 21, the instant invention includes the employment of a plurality of auxiliary anchorage elements 50 in combination with the tire trim-wheel trim construction 20, three or more auxiliary anchorage elements 50 being employed—six being indicated in FIG. 7.

Although the auxiliary anchorage clip elements 50 per se with the exception of their inner end formation are old in the art, previous concepts of their use in connection with tire trim-wheel trim construction employing an annular toothed anchorage flange such as the anchorage flange 242 of the tire trim element 24 disclosed herein had not been thoroughly successful. Among such previous attempts was the construction disclosed and claimed in U.S. Patent No. 2,963,325 to Charles B. Aske, Jr. et al. issued December 6, 1960, reference being made particularly to FIGS. 12 and 23 of the said patent.

In the instant invention, the tire trim element 24 of the tire trim-wheel trim assembly 20 is shown to be provided with an annular auxiliary anchor groove 249 in the anchorage flange portion 242 thereof preferably axially outwardly of the axial outermost of the circumferential axially spaced teeth 243 of the said anchorage flange 242. This annular groove 249 may be formed in any suitable manner so as to receive in abutment the anchorage flange 242 at the bottom of the said groove 249 the inner stake end 510 of the anchorage arm 51 of the auxiliary anchorage element 50. The said stake end 510 of the anchorage arm 51 of the said anchorage element 50 is preferably so formed that it will embed or stake itself into the resilient rubber at the bottom of the groove 249 of the anchorage flange 242 of the tire trim element 24.

The auxiliary anchorage element 50 is in effect a spring clip formed of a single strip of spring steel as best shown in FIGS. 4, 5 and 6 which has an anchorage arm 51 and an open looped head 52 at the upper end thereof, the juncture between the anchorage arm 51 and the open looped head 52 being reversedly bent to provide a bearing 53 at the top of the anchorage arm 51 located within and spaced from the inside of the said looped head 52. In the illustrative embodiment of the auxiliary anchorage element 50, the lower or stake end 510 of the anchorage arm 51 thereof is preferably formed arcuately and blunt as best shown in FIGS. 4 and 5 so as to become slightly embedded and staked into the resilient rubber at the bottom of the auxiliary anchor groove 249 in the anchorage flange 242 of the tire trim element 24. With such a stake end 510, the anchorage arm 51 of the auxiliary anchor element 50 will stake itself into the anchorage flange 242 of the resilient tire trim element 24 whether or not auxiliary anchor groove 249 or the like is provided to receive it; however, it has been found preferable to form a groove 249 therefor unless the rubber or other resilient material out of which the tire trim element 24 is tough as well as resilient. While one wall of the said groove 249 may coincide with the axially outer wall of the axially outermost of the teeth 243 of the annular anchorage flange portion 242 of the tire trim element 24, the said groove may be formed independently of the said outermost tooth 243.

By reference to FIG. 2, it will be observed that, when the open looped head 52 of an auxiliary anchorage element 50 is hammered in place on the lip 22 of the wheel rim 23, the looped head 52 thereof overlies the top of said wheel rim lip 22, the bearing 53 thereof engages the bottom of the wheel rim lip 22, and the anchorage arm 51 thereof is urged axially and radially inwardly toward and against the wheel rim 23 at the juncture of the annular tire bead seat 31 and the tire bead seat flange 32, thusly directing the stake end 510 of the anchorage arm 52 of the auxiliary anchorage element 50 against the bottom of the annular groove or pocket 249 of the anchorage flange portion 242 of the tire trim element 24 where it becomes anti-frictionally engaged therein. When the tire trim-wheel trim assembly 20 is removed from the rim 23 of the vehicle wheel 21 as later described, both the anchorage arm 51 and the looped head 52 of each auxiliary anchorage element 50 pivot counterclockwise as viewed in FIG. 2 against an over-center type spring action inherent in such a spring clip as the auxiliary anchorage element 50 swings about the bottom of the lip 22 of the wheel rim 23, the bearing 53 of the anchorage element 50 acting as a pivot while remaining generally in contact with the bottom of the lip 22 of the wheel rim 23.

To remove the tire trim-wheel trim assembly 20 from the vehicle wheel 21, it is manually pried and/or pulled outwardly therefrom. A relatively large force is required to remove the said tire trim-wheel trim assembly 20 from the vehicle wheel 21 because of the necessity of initially flexing and rolling over the annular teeth 243 of the tire trim element 24 from their locked position best shown in FIG. 2 to their unlocked position with the apices of the said annular teeth 243 disposed axially inwardly. During the said initial flexing and initial rolling over of the annular teeth 243 of the tire trim element 24, the hereinabove described over-center type action of the auxiliary anchorage elements 50 takes place. After the annular teeth 243 become so flexed and the auxiliary anchorage elements 50 so release their anchorage, the complete removal of the tire trim-wheel trim assembly 20 is relatively easier than accomplishing the initial removal movement thereof from the vehicle wheel.

Although but a single embodiment of the invention has been disclosed and described herein, it is obvious that many changes may be made in the size, shape, arrangement and detail of the various elements of the invention without departing from the spirit and scope thereof as defined in the appended claims.

I claim:

1. In a vehicle wheel structure including a wheel rim and a tire mounted thereon, the said wheel rim having an outer tire bead seat presenting an axially outwardly disposed annulus, and a radially disposed tire bead seat flange terminating in an axially outwardly extending rim lip, a tire trim-wheel trim assembly comprising a tire trim element including a resilient annular radially disposed tire trim portion and an annular axially disposed anchorage portion having a plurality of circumferentially disposed anchorage teeth therearound, and a wheel trim element including an axially disposed relatively rigid annular sleeve portion over which the said anchorage portion of said tire trim element is telescoped to size the same, said wheel trim-tire trim assembly being mounted on the vehicle wheel by telescoping the annular portion thereof within said tire bead seat annulus with the said anchorage teeth flexed against said tire bead seat flange, and a plurality of auxiliary spring clip anchorage means including an open looped head sprung onto the lip of the wheel rim and an anchorage arm having a free stake and extending axially and radially inwardly from said looped head engaging the bottom of the rim lip and disposed against and past the juncture of the tire bead seat flange and said tire bead seat with its free stake end engaged in staked relationship with the outer periphery of said anchorage portion of said tire trim element.

2. In a vehicle wheel structure as claimed in claim 1 wherein the free stake end of the anchorage arm of said auxiliary spring clip anchorage means engages the annular axially disposed anchorage portion of the said tire trim element substantially at the axially outer face of the outermost circumferential tooth thereof.

3. In a vehicle wheel structure as claimed in claim 1 wherein the annular axially disposed anchorage portion of the said tire trim element has a circumferential groove in the outer periphery thereof to accommodate the free stake end of the anchorage arm of said auxiliary spring clip anchorage means.

4. In a vehicle wheel structure as claimed in claims 1, 2 and 3 wherein the free stake end of the anchorage arm of the auxiliary spring clip anchorage means is formed blunt on a relatively flat arc whereby to prevent cutting into the resilient annular axially disposed anchorage portion of said tire trim element.

References Cited in the file of this patent

UNITED STATES PATENTS

| 2,963,325 | Aske et al. | Dec. 6, 1960 |
| 2,970,012 | Lyon | Jan. 31, 1961 |

FOREIGN PATENTS

| 1,061,278 | France | Nov. 25, 1953 |